United States Patent
Ofek et al.

(10) Patent No.: US 10,215,585 B2
(45) Date of Patent: Feb. 26, 2019

(54) BLOCK VIEW FOR GEOGRAPHIC NAVIGATION

(71) Applicant: Microsoft Technology Licensing, LLC, Redmond, WA (US)

(72) Inventors: Eyal Ofek, Redmond, WA (US); Blaise H. Aguera y Arcas, Seattle, WA (US); Pasquale DeMaio, Bellevue, WA (US); Yonatan Wexler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 15/042,776

(22) Filed: Feb. 12, 2016

(65) Prior Publication Data

US 2016/0161276 A1 Jun. 9, 2016

Related U.S. Application Data

(62) Division of application No. 12/490,130, filed on Jun. 23, 2009, now Pat. No. 9,298,345.

(51) Int. Cl.
*G01C 21/36* (2006.01)
*G06F 3/0481* (2013.01)

(52) U.S. Cl.
CPC ....... *G01C 21/367* (2013.01); *G06F 3/04815* (2013.01)

(58) Field of Classification Search
CPC .... G01C 21/367; G09B 29/106; G09B 29/10; G06T 11/206; G06T 17/05; G06T 19/00; G06T 19/003; G06T 19/20; G06T 2210/36; G06T 2215/12; G06T 2219/028; G06T 2219/2004
See application file for complete search history.

(56) References Cited

U.S. PATENT DOCUMENTS

| | | | |
|---|---|---|---|
| 4,992,947 A | 2/1991 | Nimura et al. | |
| 5,115,398 A | 5/1992 | De Jong | |
| 5,559,707 A | 9/1996 | Delorme et al. | |
| 5,982,298 A | 11/1999 | Lappenbusch et al. | |

(Continued)

OTHER PUBLICATIONS

Michael Miller, "Googlepedia: the Ultimate Google Resource", Third Edition, Oct. 29, 2008.

(Continued)

*Primary Examiner* — Thomas G Black
*Assistant Examiner* — Ce Li Li

(57) ABSTRACT

Various embodiments provide techniques for geographic navigation via one or more block views. According to some embodiments, a block view can include a visual image of a geographic location that is visually similar to a panoramic image. In some example implementations, a block view can be scrolled to navigate images of a geographic location. In one or more embodiments, a bubble view can be displayed of one or more locations within the block view. The bubble view can include a zoomed image of one or more aspects of a block view. Further to some embodiments, a map view can be utilized along with the block view and/or the bubble view. The map view can include a two-dimensional representation of the geographic location from an aerial perspective, and can include a more general level of detail concerning the geographic location, such as streets, cities, states, bodies of water, and so on.

20 Claims, 16 Drawing Sheets

(56) References Cited

U.S. PATENT DOCUMENTS

| | | | |
|---|---|---|---|
| 6,199,014 | B1 | 3/2001 | Walker et al. |
| 6,282,362 | B1 | 8/2001 | Murphy et al. |
| 6,628,283 | B1 * | 9/2003 | Gardner .............. G06F 3/04845 345/427 |
| 7,050,102 | B1 | 5/2006 | Vincent |
| 7,587,276 | B2 * | 9/2009 | Gold ..................... G01C 21/26 340/989 |
| 7,840,032 | B2 | 11/2010 | Ofek |
| 8,645,055 | B2 | 2/2014 | Chen et al. |
| 8,868,338 | B1 * | 10/2014 | Chau ..................... G06T 11/206 701/455 |
| 9,298,345 | B2 | 3/2016 | Ofek et al. |
| 2002/0154174 | A1 * | 10/2002 | Redlich .............. G06F 3/04815 715/848 |
| 2004/0204836 | A1 | 10/2004 | Riney |
| 2006/0075442 | A1 * | 4/2006 | Meadow ........... G06F 17/30241 725/91 |
| 2006/0089792 | A1 * | 4/2006 | Manber .............. G01C 21/3644 701/408 |
| 2006/0173614 | A1 | 8/2006 | Nomura |
| 2006/0271287 | A1 * | 11/2006 | Gold ..................... G01C 21/26 701/426 |
| 2006/0287815 | A1 | 12/2006 | Gluck |
| 2007/0076920 | A1 | 4/2007 | Ofek |
| 2007/0226614 | A1 | 9/2007 | Lorenzen et al. |
| 2008/0043020 | A1 | 2/2008 | Snow et al. |
| 2008/0189031 | A1 * | 8/2008 | Meadow .............. G09B 29/108 701/532 |
| 2008/0291217 | A1 * | 11/2008 | Vincent .................. G06T 17/05 345/629 |
| 2008/0292213 | A1 * | 11/2008 | Chau ................. G06F 17/30265 382/294 |
| 2008/0303803 | A1 | 12/2008 | O'Brien et al. |

OTHER PUBLICATIONS

Vincent Luc, "Taking Online Maps Down to Street Level", Retrieved at: <<http://www.vincent-net.com/07ieeecomputer_streetview_web.pdf>>, Dec. 2007. CTS 2008, pp. 118-120.

"Google 3D Warehouse Adds Street View", Retrieved at: <<http://www.ditii.corn/200 8/04/10/google-3d-warehouse-adds-street-view/>>, Apr. 10, 2008, pp. 1-5.

"Live Search Maps", Retrieved at <<http://www.microsoft.com/presspass/download/newsroom/msn/wllocairg.doc>>, Dec. 2006, pp. 36.

"OpenStreetMap (V 1.1)", Retrieved at <<http://www10.lotus.corn/ldd/mashupswiki.nsf/dx/openstreetmap->>, "IBM Mashup Centerwiki", Mar. 19, 2009, pp. 1-5.

Chen, Shenchang E., "QuickTime® VR—An Image-Based Approach to Virtual Environment Navigation", ACM-0-89797-701-4/95/008, (1995), pp. 29-38.

Hirose, Michitaka, "Image-Based Virtual World Generation", *IEEE* 1070-986X/97, (Jan.-Mar. 1997), pp. 27-33.

Mohl, Robert "Cognitive Space in the Interactive Movie Map: An Investigation of Spatial Learning in Virtual Environments", Massachusetts Institute of Technology, Department of Architecture, (Feb. 1982), 232 pages.

U.S. Appl. No. 12/490,130, Office Action dated Feb. 3, 2012, 11 pgs.

U.S. Appl. No. 12/490,130, Amendment and Response filed Jun. 1, 2012, 9 pgs.

U.S. Appl. No. 12/490,130, Office Action dated Aug. 31, 2012, 14 pgs.

U.S. Appl. No. 12/490,130, Amendment and Response filed Nov. 30, 2012, 13 pgs.

U.S. Appl. No. 12/490,130, Office Action dated Oct. 8, 2013, 15 pgs.

U.S. Appl. No. 12/490,130, Amendment and Response filed Feb. 7, 2014, 15 pgs.

U.S. Appl. No. 12/490,130, Office Action dated Jun. 4, 2014, 17 pgs.

U.S. Appl. No. 12/490,130, Amendment and Response filed Oct. 6, 2014, 14 pgs.

U.S. Appl. No. 12/490,130, Office Action dated Apr. 30, 2015, 20 pgs.

U.S. Appl. No. 12/490,130, Amendment and Response filed Aug. 28, 2015, 17 pgs.

U.S. Appl. No. 12/490,130, Notice of Allowance dated Oct. 22, 2015, 5 pgs.

\* cited by examiner

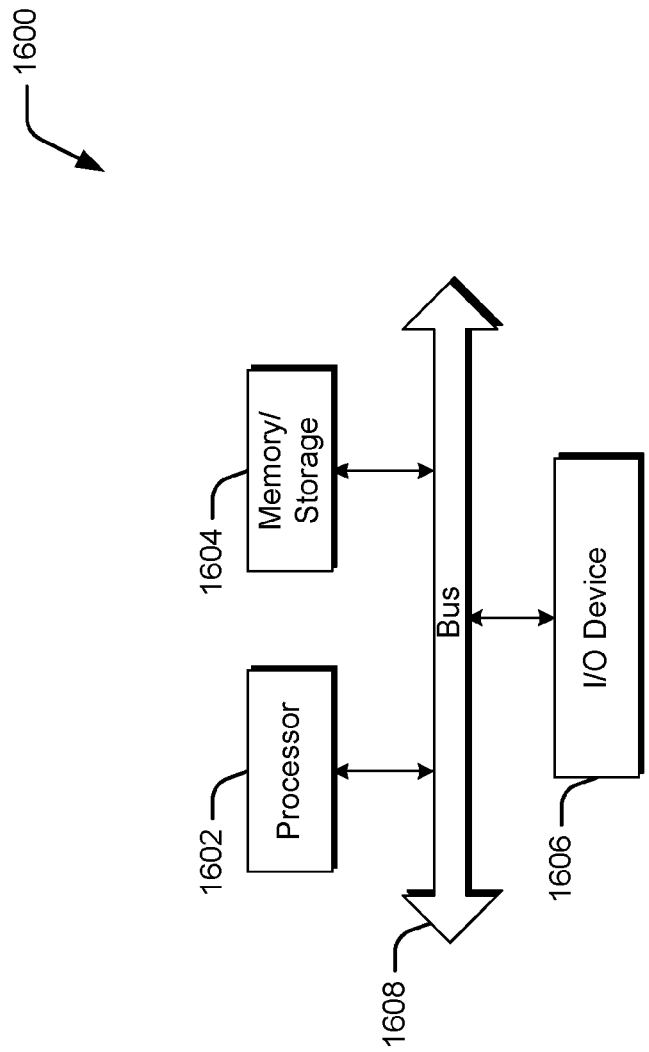

BLOCK VIEW FOR GEOGRAPHIC NAVIGATION

RELATED CASE

This application is a division of U.S. patent application Ser. No. 12/490,130, filed on Jun. 23, 2009 and entitled "Block View for Geographic Navigation," which is now U.S. Pat. No. 9,298,345, hereby incorporated by reference in its entirety.

BACKGROUND

Navigation applications can provide ways for navigating maps and/or geographic images. Many current navigation applications, however, fail to provide a user with sufficient context in a navigation experience. Without sufficient context, a user can lose his or her orientation during a navigation experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for geographic navigation via one or more block views. According to some embodiments, a block view can include a visual image of a geographic location that is visually similar to a panoramic image, but may have no fixed or parametric center of projection. Thus, in some example implementations, a block view can be scrolled to navigate one or more images of a geographic location.

In one or more embodiments, a bubble view of one or more locations within the block view can be displayed. A bubble view can include a zoomed image of the location(s) from the block view and can provide more graphic detail of the location(s). Further to some embodiments, a map view can be utilized along with a block view and/or a bubble view. A map view can include a two-dimensional representation of a geographic location from an aerial perspective. A map view can include a more general level of detail concerning a geographic location, such as streets, cities, states, bodies of water, and so on.

BRIEF DESCRIPTION OF THE DRAWINGS

The same numbers are used throughout the drawings to reference like features.

FIG. 16 is a block diagram of a system in accordance with one or more embodiments.

DETAILED DESCRIPTION

Overview

Figure 1:
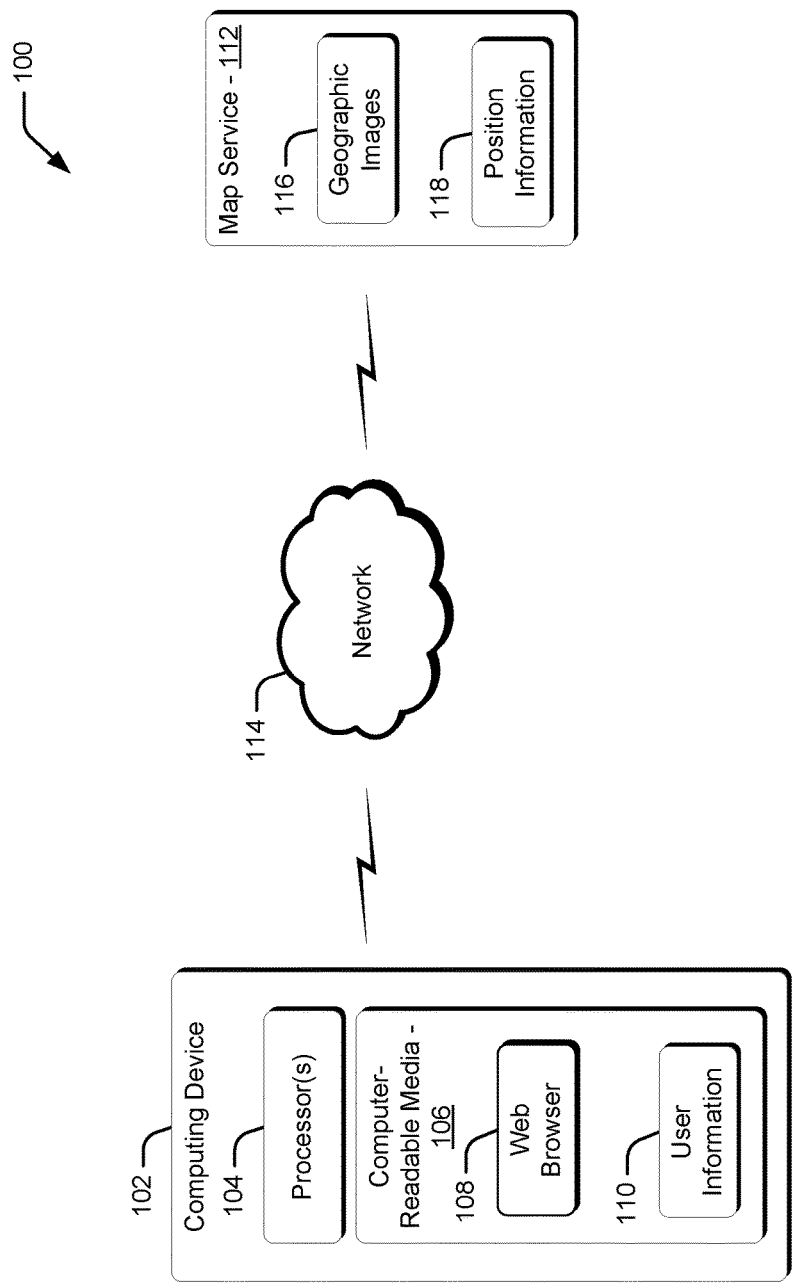
FIG. 1 illustrates an operating environment in which the inventive principles can be employed in accordance with one or more embodiments.

Various embodiments provide techniques for geographic navigation via one or more block views. According to some embodiments, a block view can include a visual image of a geographic location that is visually similar to a panoramic image, but the block view may have no fixed or parametric center of projection. Thus, in some example implementations, a block view can be scrolled to navigate one or more images of a geographic location.

For example, consider a scenario where multiple images are captured in the downtown Seattle area. The images can be navigated by stitching the images together to create a block view of downtown Seattle. Thus, in this example scenario, an instance of the block view of downtown Seattle can include a view of one side of $1^{st}$ Avenue. A user can navigate north or south along $1^{st}$ Ave (e.g., by moving an icon or other indicium along a visual representation of $1^{st}$ Ave), which can cause the block view to move north or south along $1^{st}$ Ave. The term "block view" is not intended to be limiting, and it is to be appreciated that a particular block view can include a variety of different portions of geographic images.

In one or more embodiments, a bubble view can be displayed of one or more locations within the block view. A bubble view can include a zoomed image of one or more aspects of a block view. For example, in the scenario mentioned above, a bubble view can include a zoomed image of one or more buildings along $1^{st}$ Ave. in Seattle. Thus, in some implementations, a block view can provide a user with higher level context (e.g., a particular block or blocks in downtown Seattle), while a bubble view can provide the user with more detail about a particular location.

Some embodiments utilize a map view along with a block view and/or a bubble view. A map view can include a two-dimensional representation of a geographic location from an aerial perspective and can include a more general level of detail concerning a geographic location, such as streets, cities, states, bodies of water, and so on.

In some embodiments, a block view can be displayed along with a bubble view and/or a map view to provide a user with a robust collection of information about one or more geographic locations. A user can navigate within each of the views, and user navigation within one view can cause an automatic navigation within one or more of the other views.

In the discussion that follows, a section entitled "Operating Environment" describes but one environment in which the various embodiments can be employed. Following this, a section entitled "Example User Interfaces" describes example user interfaces in accordance with one or more embodiments. Next, a section entitled "Mapping between Views and the World" describes example techniques for mapping between pixels used to create a particular view and geographic coordinates, in accordance with one or more embodiments. Following this, a section entitled "Example Methods" describes example methods in accordance with one or more embodiments. Last, a section entitled "Example System" is provided and describes an example system that can be used to implement one or more embodiments.

Operating Environment

FIG. 1 illustrates an operating environment in accordance with one or more embodiments, generally at 100. Environment 100 includes a computing device 102 having one or more processors 104 and one or more computer-readable storage media 106. The computer-readable storage media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 16.

The computing device 102 also includes various types of software applications that can implement and/or access the functionality described herein. One such application is a web browser 108 that resides on the computer-readable storage media 106. The computing device 102 also includes user information 110 that resides on the computer-readable storage media 106. The user information 110 can include information such as user identification/authentication information, user login information, user preferences, and so on.

According to one or more embodiments, the computing device 102 is configured to access a map service 112 via a network 114. Examples of the network 114 include the Internet, a wide area network, a local area network, and so on. The map service 112 includes geographic images 116 and position information 118. The geographic images 116 can include a variety of different image types, such as photographs, video, maps, and so on. Examples of the position information 118 include Global Positioning System (GPS) information, inertial measurement unit (IMU) information, GLONASS information, Galileo navigation system information, cell phone triangulation information, and so on. In some embodiments, geographic coordinates (e.g., GPS coordinates) from the position information 118 can be mapped to a geographic image of the geographic images 116 to enable the geographic image to be associated with a particular location in the world.

In some example implementations, the map service 112 can provide data used to display one or more of a block view, a bubble view, and/or a map view of a geographic location for display and navigation via the web browser 108. For example, a user can navigate one or more geographic images using a variety of user input techniques or devices, such as by dragging a cursor with a mouse, touch input, voice recognition input, and so on.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of example user interfaces that can be utilized to implement one or more embodiments discussed herein. The example user interfaces are discussed with reference to environment 100, above.

Example User Interfaces

Figure 2:
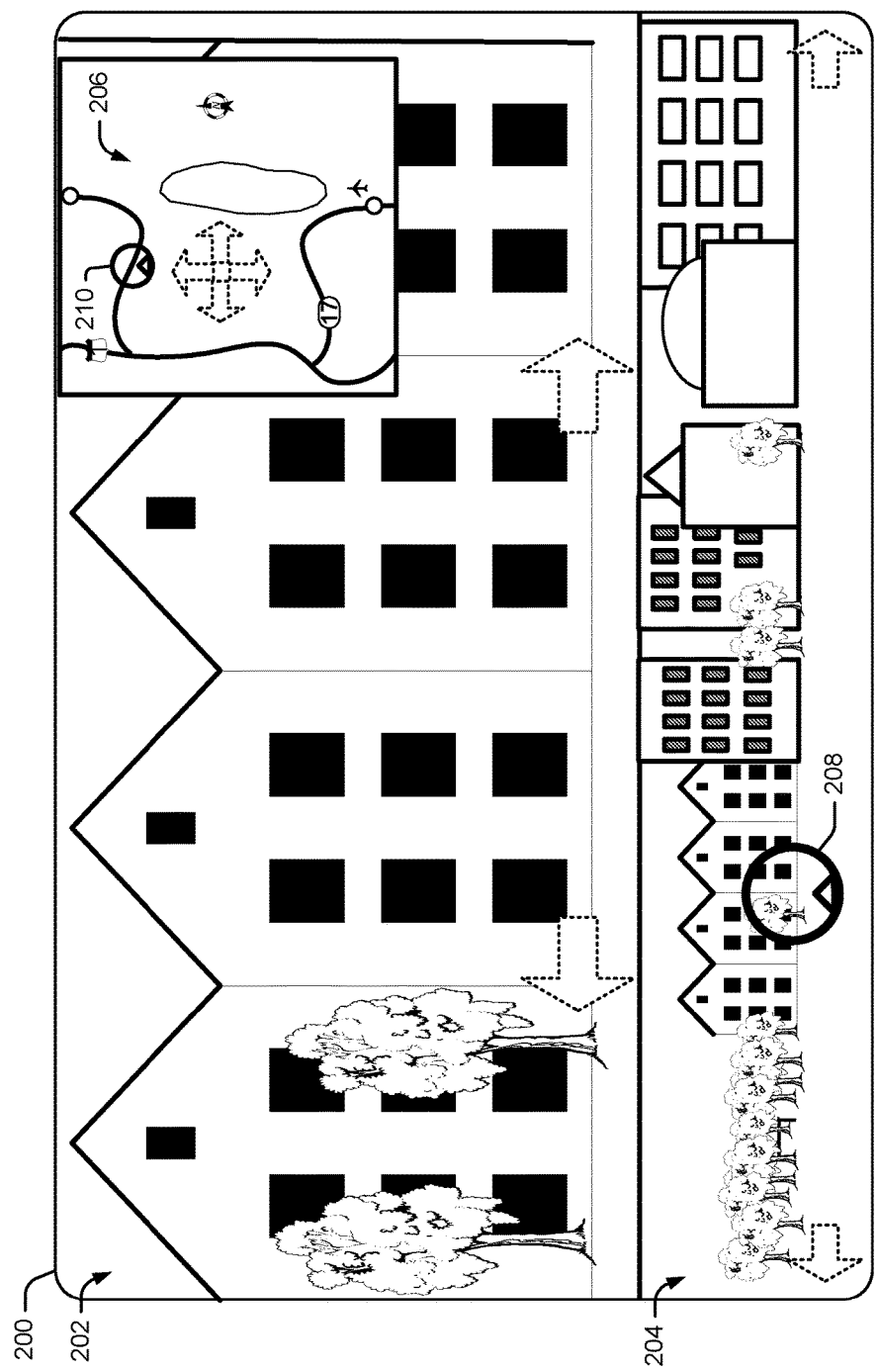
FIG. 2 illustrates an example user interface in accordance with one or more embodiments.

FIG. 2 illustrates an example user interface in accordance with one or more embodiments, generally at 200, for navigating one or more views of a geographic location. According to some embodiments, the user interface 200 can be associated with one or more applications, such as the web browser 108, and can be displayed by a computing device, such as computing device 102.

The user interface 200 includes a bubble view 202, a block view 204, and a map view 206. According to one more embodiments, a bubble view can include a spherical panoramic image that is captured and/or created in 360° around a particular point. For example, a bubble view can be created by capturing one or more images that correspond to rays that travel through a point from 360° around the point. According to one or more embodiments, the captured images can be stitched together utilizing any appropriate image stitching technique to form the bubble view. Thus, in some implementations a bubble view can be rotated to view images captured around a particular point. In some embodiments, an instance of a bubble view can be considered a "capture event". Multiple capture events can be utilized along a particular navigable route (e.g., a roadway) to enable navigation among capture events via a bubble view along the navigable route.

In this example embodiment, the block view 204 displays an image of a city block. According to some embodiments, a block view can be created by stitching together a plurality of images captured along a linear or pseudo-linear route using any appropriate image stitching method. Thus, in some implementations, a block view can be scrolled to display images of locations that are not currently displayed and that are peripheral and/or adjacent to a currently-displayed location. Further to some embodiments, irregularities in the images used to create the block view (e.g., a building that protrudes beyond other features included in the images) can be normalized to enable an easily-navigable block view to be presented.

In one or more embodiments, the block view 204 can include an abstraction of a particular geographic location, such as an approximated outline drawing of a city block. Thus, and further to some embodiments, the abstracted image in the block view 204 can be navigated and actual images that correspond to the abstracted image can populate the bubble view 202. Additionally and/or alternatively, navigation can occur via an abstracted block view, and when a zoom-in occurs on the abstracted block view, one or more actual images can be downloaded and used to populate a bubble view. According to one or more embodiments, if a zoom-out occurs from the bubble view, the view can return to the abstracted block view. Using an abstracted image for the block view 204 can reduce the amount of data used to create the user interface 200 and can allow for a smoother navigation experience.

In this particular example, the bubble view 202 corresponds to a particular location within the block view 204, as indicated by a block icon 208. According to one or more embodiments, the block icon 208 can indicate an approximate position and orientation of an image that is used to create the bubble view 202. As illustrated here, the block icon 208 corresponds to a location in the block view 204 that is used to populate the bubble view 202.

The map view 206 includes, according to some embodiments, a map icon 210 that indicates a map location and a map orientation of the block view 204 and/or the bubble view 202. In some embodiments, the map view 206 can represent a more general location of the bubble view 202 and/or the block view 204.

According to some embodiments, one or more of the bubble view 202, the block view 204, and/or the map view 206 are navigable to move among geographic locations. In this particular example, each of the bubble view 202, the block view 204, and the map view 206 includes selectable arrows that are selectable to navigate within the particular view. In some implementations, navigation can also be accomplished by dragging an icon, such as the block icon 208 and/or the map icon 210.

In one or more embodiments, user navigation within one of the views can cause an automatic navigation within one or more of the other views. For example, if a user were to drag the block icon 208 to a new location within the block view 204, the images displayed within the bubble view 202 and/or the map view 206, and/or the location of the map icon 210, can be updated to correspond to the new location of the block icon 208. As a further example, if a user were to drag the map icon 210 within the map view 206, the bubble view 202 and/or the block view 204 can be updated to correspond to the new location of the map icon 210.

In one or more example implementations, navigation within the bubble view 202 (e.g., by selecting one of the selectable arrows) can cause the bubble view 202 to rotate around a point within the bubble view. In this particular example, the bubble view 202 is facing a side of a city block. Thus, navigating the bubble view 202 can cause the bubble view to rotate away from the side of the city block, e.g., to face up or down a city street the runs in front of the city block. According to some implementations, when the bubble view 202 rotates, the block icon 208 and/or the map icon 210 can automatically rotate to indicate a new orientation of the bubble view 202. For example, if the bubble view 202 rotates to face down a street, the block icon 208 can rotate such that the pointer within the block icon points down the street within the block view 204.

Figure 3:
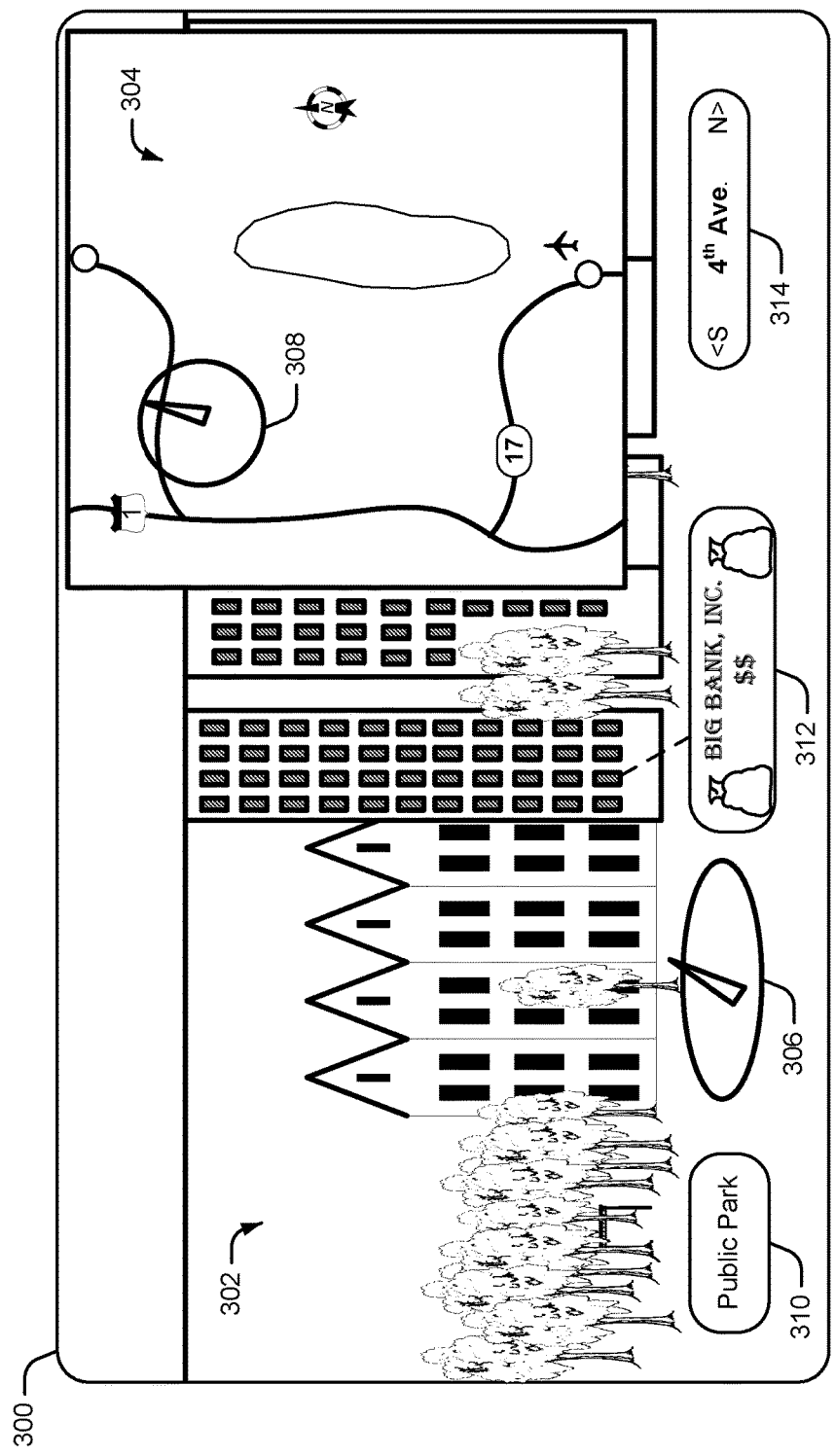
FIG. 3 illustrates an example user interface in accordance with one or more embodiments.

FIG. 3 illustrates an example user interface in accordance with one or more embodiments, generally at 300, for navigating one or more views of a geographic location and viewing annotations of the geographic location. According to some embodiments, the user interface 300 can be associated with one or more applications, such as the web browser 108, and can be displayed by a computing device, such as computing device 102.

User interface 300 includes a block view 302 and a map view 304. As part of the block view 302 is a block icon 306 that indicates an orientation of a bubble view (e.g., the bubble view 202 of FIG. 2) associated with the block view 302. To aid in this discussion, user interface 300 is illustrated without a bubble view. However, it is to be appreciated that, in some implementations, one or more bubble views can be included as part of or adjacent to the user interface 300. In this example implementation, the block icon 306 includes a pointer that points to indicate the orientation of an associated bubble view with respect to the block view 302.

Included with the map view 304 is a map icon 308. Similarly to the block icon 306, the map icon 308 includes a pointer that indicates an orientation of the block view 302 and/or an associated bubble view with respect to the map view 304.

The user interface 300 also includes annotations 310, 312, 314. According to some embodiments, annotations can be added to a bubble view, a block view, and/or a map view. Annotations can be populated with a variety of metadata concerning a variety of geographic locations, such as businesses, locations of historical significance, locations of personal significance, and so on. According to some embodiments, information used to populate an annotation can be retrieved from a geographic database (such as a geographic information system (GIS)), added by a user, and so on. In some example implementations, an annotation can attach to a particular image or region in a view and can thus move within the view based on movement of the image or region within the view.

Figure 4:
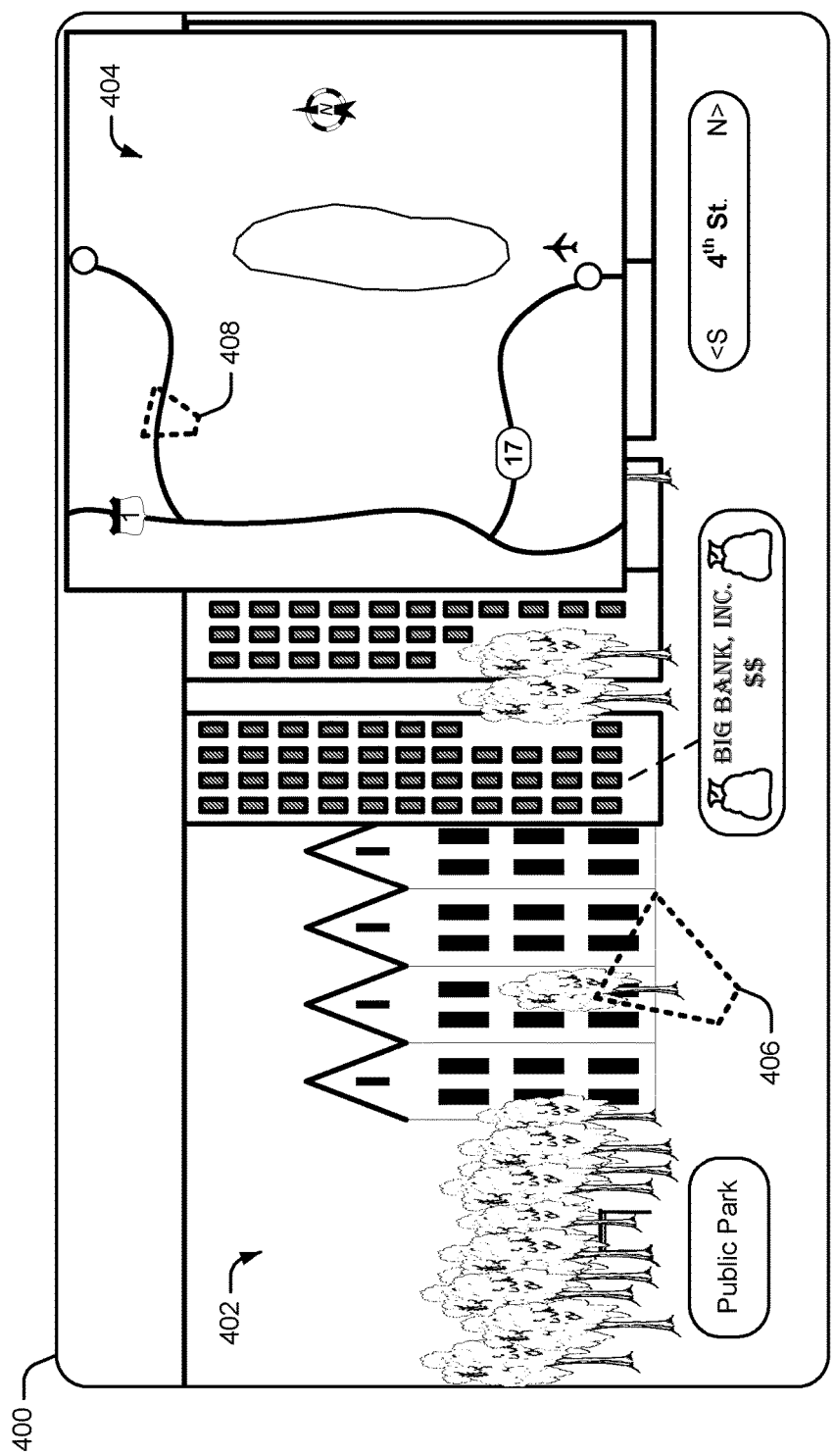
FIG. 4 illustrates an example user interface in accordance with one or more embodiments.

FIG. 4 illustrates an example user interface in accordance with one or more embodiments, generally at 400, for navigating one or more views of a geographic location and determining a bubble view orientation. According to some embodiments, the user interface 400 can be associated with one or more applications, such as the web browser 108, and can be displayed by a computing device, such as computing device 102.

The user interface 400 includes a block view 402 and a map view 404. In some embodiments, the block view 402 and the map view 404 are associated with a bubble view, such as the bubble view 202 (FIG. 2). The block view 402 illustrates another way of indicating an orientation of a bubble view, illustrated here as a block focus icon 406. For purposes of illustration, in some implementations the block focus icon 406 can be envisioned as a "flashlight" that shines on a particular area of the bubble view 402. In this illustrated example, the block focus icon 406 indicates a particular area of the block view 402 that is in focus in an associated bubble view (e.g., the bubble view 202).

Included as part of the map view 404 is a map focus icon 408. The map focus icon 408 indicates an area of the map view 404 that is in focus in the block view 402 and/or an associated bubble view. Similar to some of the previously-discussed embodiments, the block focus icon 406 and/or the map focus icon 408 can move based on a change in a geographic location that is in focus. Further to some embodiments, the block focus icon 406 and/or the map focus icon 408 can be manipulated (e.g., via a cursor and a mouse) to change a particular geographic location that is in focus in one or more of the views.

Figure 5:
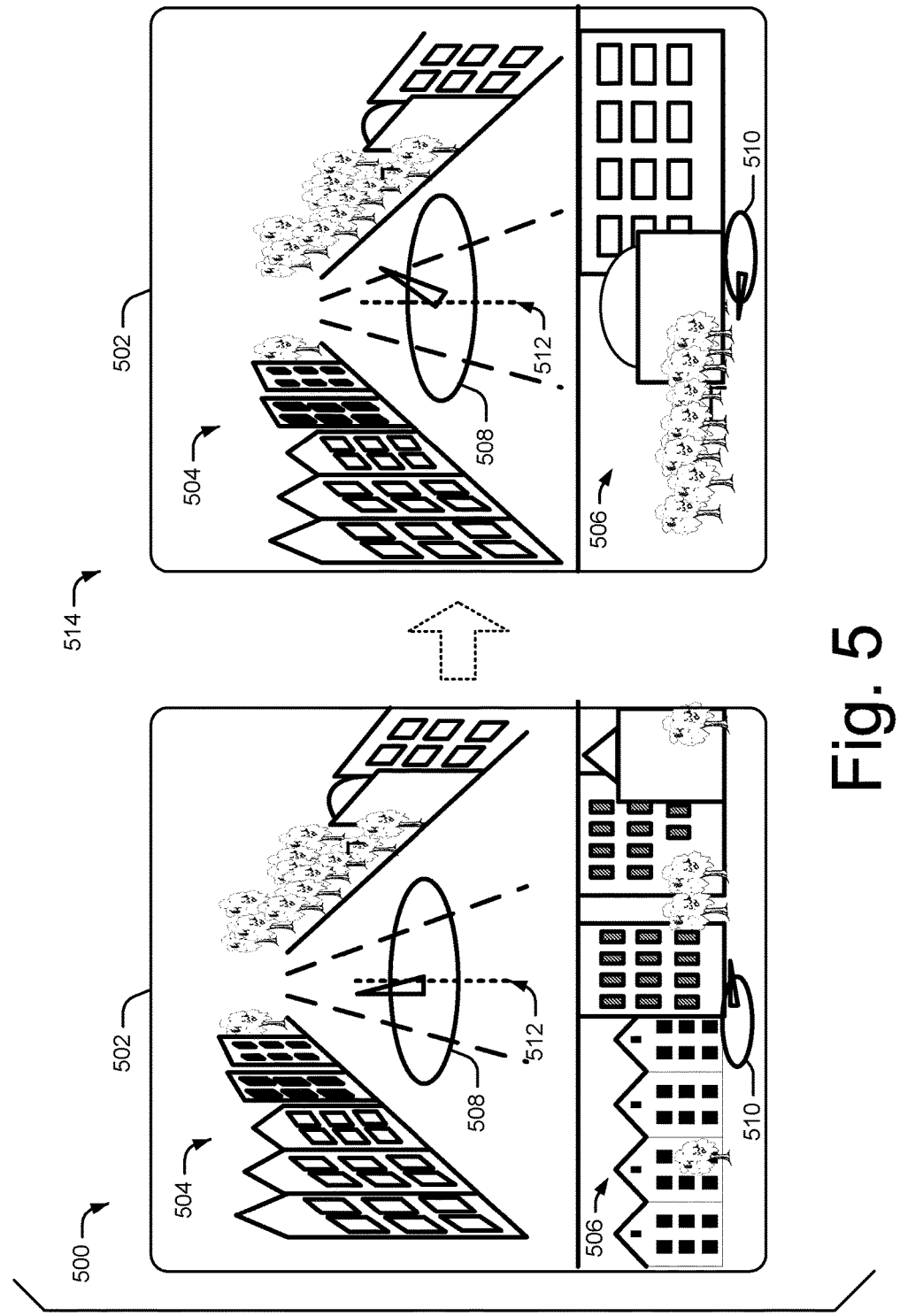
FIG. 5 illustrates an example user interface in accordance with one or more embodiments.

FIG. 5 illustrates at 500 an example user interface 502 in accordance with one or more embodiments for navigating one or more views of a geographic location and changing block views based on a bubble view orientation. According to some embodiments, the user interface 502 can be associated with one or more applications, such as the web browser 108, and can be displayed by a computing device, such as computing device 102.

The user interface 502 includes a bubble view 504 and a block view 506. In this example, the bubble view 504 is focused down a road and includes a bubble icon 508 that points in a general direction of focus for the bubble view 504. The block view 506 includes a block icon 510 that indicates (e.g., via the illustrated pointer) a region of the block view 506 that is in focus in the bubble view 504.

According to one or more embodiments, a particular block view that is displayed can be determined by an orientation of a bubble view. In this particular illustration, the bubble icon 508 is associated with a block threshold 512 (illustrated as the dotted line through the bubble icon 508). When the orientation of the bubble icon 508 is on one side of the block threshold 512, a particular region of the bubble view 504 can be in focus in the block view 506. For example, in this particular implementation, the bubble icon 508 points to the left of the block threshold 512, and thus the region of the bubble icon to the left of the block threshold 512 is displayed in the block view 506.

At 514, the orientation of the bubble view 504 has changed such that the bubble icon 508 points to the right of the block threshold 512. Responsive to the change in the orientation of the bubble view 504, the block view 506 changes to display a region of the bubble view 504 that is oriented to the right of the block threshold 512.

Figure 6:
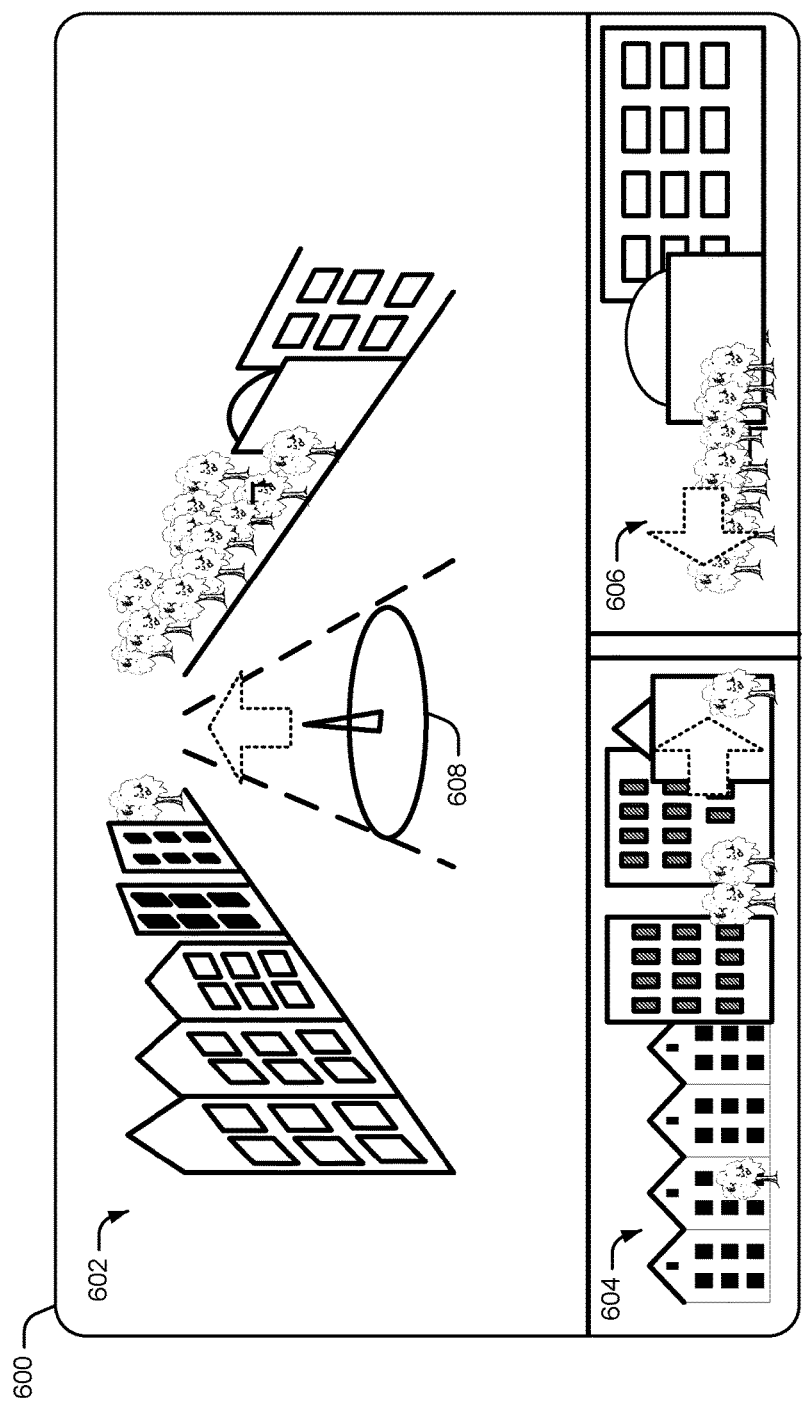
FIG. 6 illustrates an example user interface in accordance with one or more embodiments.

FIG. 6 illustrates an example user interface in accordance with one or more embodiments, generally at 600, for navigating one or more views of a geographic location and scrolling block views based on bubble view navigation. According to some embodiments, the user interface 600 can be associated with one or more applications, such as the web browser 108, and can be displayed by a computing device, such as computing device 102.

The user interface 600 includes a bubble view 602, a first block view 604, and a second block view 606. According to some embodiments, a plurality of block views associated with a bubble view can be displayed. In this particular example, the first block view 604 corresponds to the left side of the bubble view 602, and the second block view 606 corresponds to the right side of the bubble view 602.

In some embodiments, navigation within the bubble view 602 can occur by manipulating a bubble icon 608 (e.g., via user input). When navigation occurs within the bubble view 602, navigation within the block views 604, 606 can occur. In some example implementations, navigation within the block views 604, 606 can occur automatically and responsive to the navigation within the bubble view 602. Thus, in this particular example implementation, block views 604, 606 correspond to opposite sides of a roadway, and scrolling of the block views 604, 606 along the opposite sides of the roadway can occur responsive to navigation down the roadway within the bubble view 602.

Figure 7:
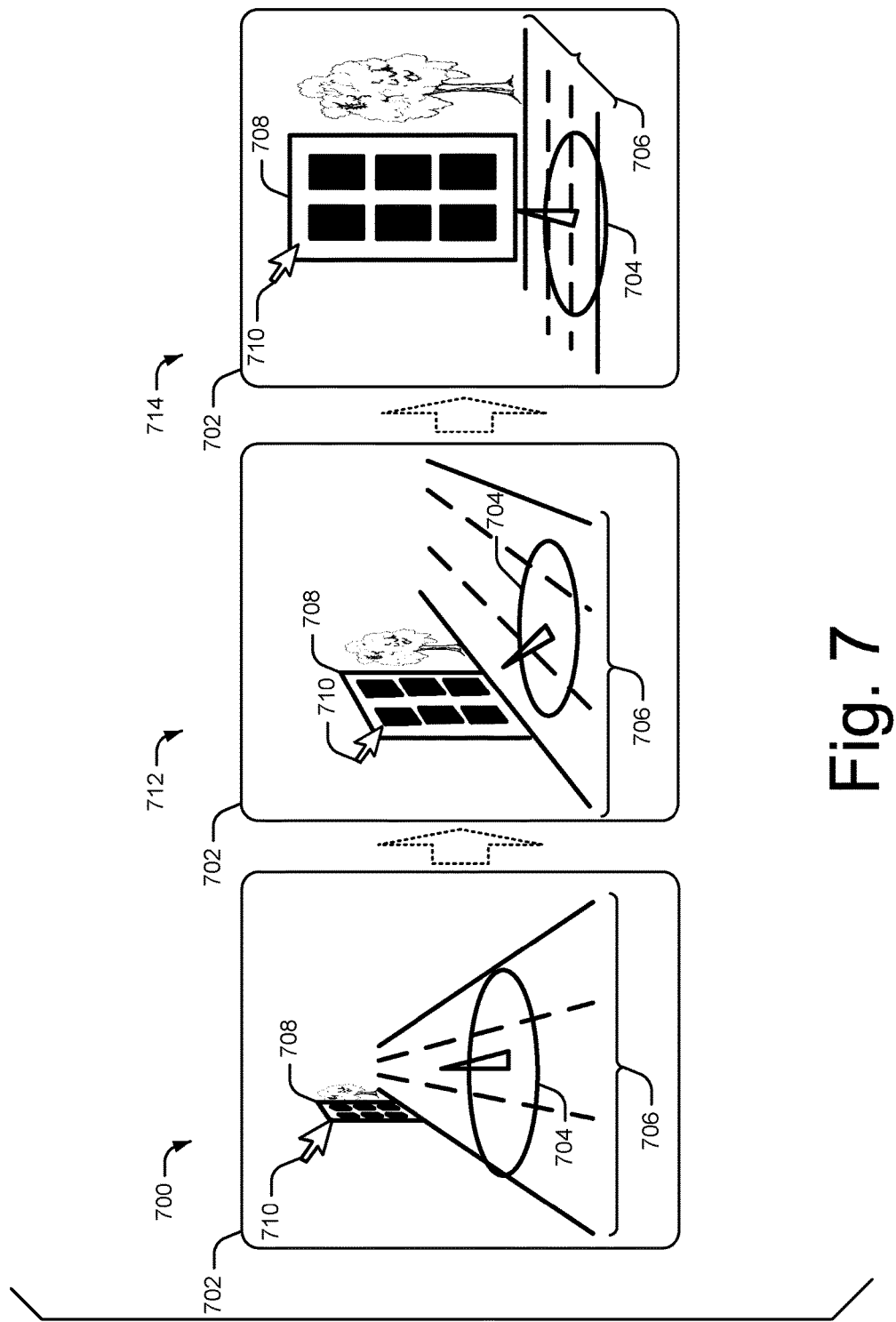
FIG. 7 illustrates an example zoom navigation technique, according to one or more embodiments.

FIG. 7 illustrates an example zoom navigation technique, according to one or more embodiments. The zoom navigation technique can be utilized and/or displayed in one or more of the user interfaces discussed herein and can be associated with one or more applications, such as the web browser 108.

At 700, a bubble view 702 is presented with a bubble icon 704 and a route 706 (e.g., a roadway). As illustrated at 700, the bubble icon 704 points along the route 706. According to some embodiments, when a bubble icon is oriented along a route, a zoom function can cause the bubble view to navigate along the route. In some implementations, a view can be zoomed via user input, such as a selection of a zoom icon, rotating a mouse wheel, pressing a zoom button on a keyboard, and so on. In the example illustrated at 700, a zoom function is activated, which causes the bubble view 702 to navigate along the route 706 toward a location 708. Also illustrated as part of the bubble view 702 is a cursor 710 that is used to place focus on the location 708. A cursor is used for purposes of example only, and it is to be appreciated that any appropriate means may be utilized to place focus on a location and/or object. According to one or more embodiments, the cursor 710 can be manipulated via one or more forms of user input.

At 712, activating the zoom function has caused navigation in the bubble view 702 to proceed further along the route 706 toward the location 708. According to some embodiments, placing focus on the location 708 (e.g., by selecting the location via the cursor 710) causes navigation in the bubble view 702 to orient towards the location 708. For example, as the navigation progresses along the route 706 toward the location 708 (e.g., via activation of the zoom function), the bubble view 702 can rotate toward the location 708 as the navigation approaches the location.

At 714, navigation along the route 706 has arrived at the location 708. Since the location 708 is still in focus (e.g., still selected with the cursor 710), the bubble view 702 rotates to face the location 708. According to some embodiments, when the bubble view 702 faces the location 708, activating a zoom function can cause the bubble view 702 to zoom into and/or away from the front surface (e.g., face) of the location 708.

Thus, in one or more embodiments, the effect of the zoom function can be determined based on a direction of navigation and/or a particular location that is in focus. As illustrated here, when the location 708 is further away in the bubble view 702 (e.g., at 700), activating the zoom function can cause navigation along the route 706. When the location 708 is selected, activating the zoom function causes the navigation along the route 706 to orient towards the location 708 until the location is reached. When the location 708 is reached, the effect of the zoom function can change from navigation along the route 706 to zooming into and/or out of a view of the location 708.

Figure 8:
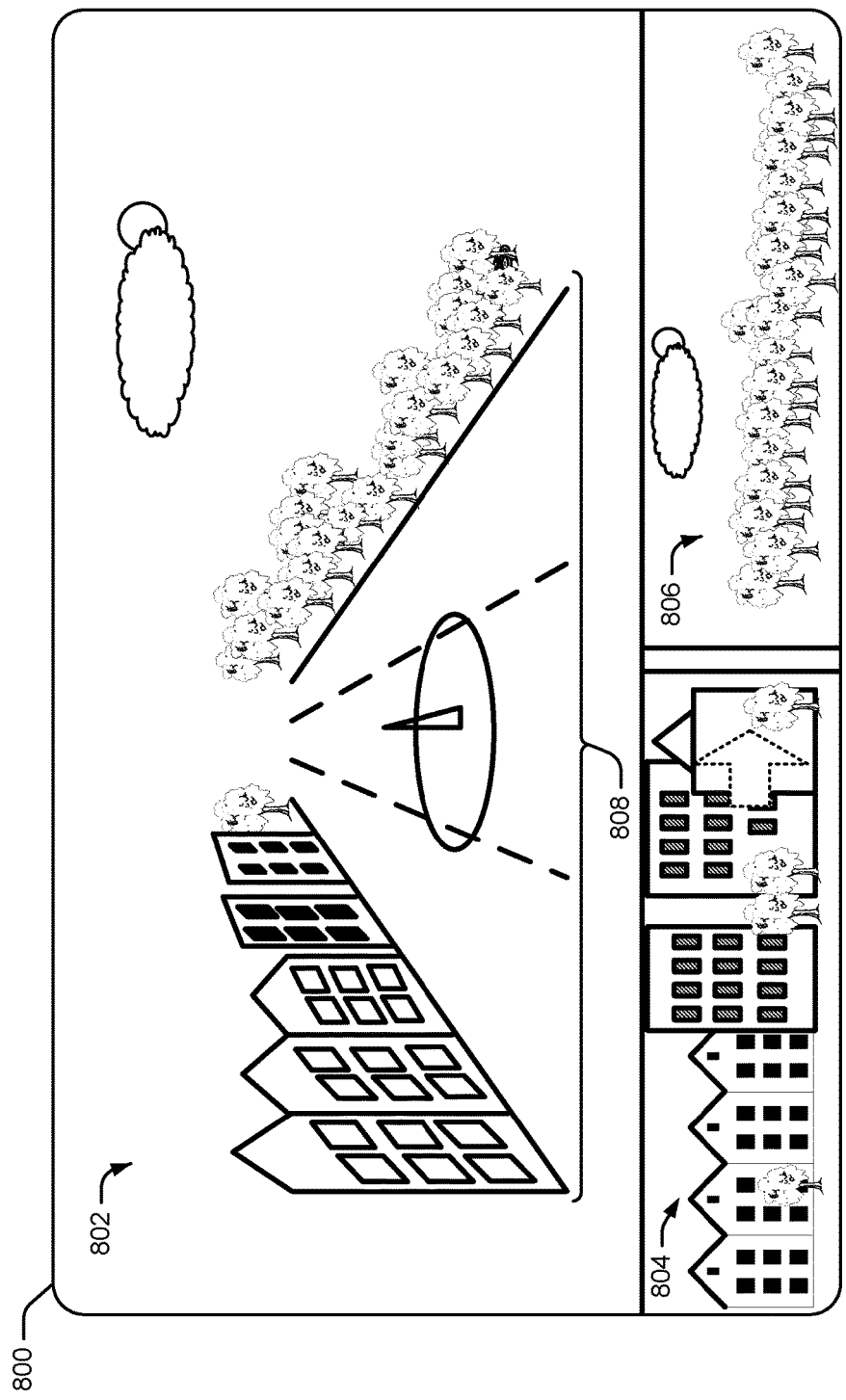
FIG. 8 illustrates an example user interface in accordance with one or more embodiments.

FIG. 8 illustrates an example user interface in accordance with one or more embodiments, generally at 800, for navigating one or more views of a geographic location and utilizing static images for repetitive landscapes. According to some embodiments, the user interface 800 can be associated with one or more applications, such as the web browser 108, and can be displayed by a computing device, such as computing device 102.

User interface 800 includes a bubble view 802, a first block view 804, and a second block view 806. According to some embodiments, navigation along a route 808 occurs in the bubble view 802, such as, for example, utilizing the zoom navigation technique discussed above. In this particular example, the first block view 804 corresponds to the left side of the route 808, and the second block view 806 corresponds to the right side of the route 808.

According to some embodiments, one or more locations encountered during a navigation experience may be somewhat homogenous or repetitive in nature. For example, a road can travel next to a forested area for many kilometers. In one or more embodiments, when a route being navigated includes a relatively repetitive landscape, one or more images associated with the navigation can be static images.

In this particular example, the landscape to the left of the route 808 includes buildings and other features that include a relatively constant visual variation during navigation of this particular section of the route 808. However, the landscape to the right of the route 808 includes a forested area that appears to change very little during navigation of this particular section of the route. Thus, according to some embodiments, the first block view 804 can be updated with new images as navigation of the route 808 in the bubble view 802 progresses. Since the landscape to the right of the route 808 appears to change very little during the navigation of this particular section of route 808, a static image can be displayed as part of the second block view 806. The static image can include a photograph captured along this particular section of the route 808. When the landscape to the right of the route 808 changes, such as when the navigation of the route 808 encounters an urban area, the static image in the second block view 806 can be replaced with a dynamic image that is updated with new images (e.g., via scrolling) as navigation along the route 808 progresses.

Figure 9:
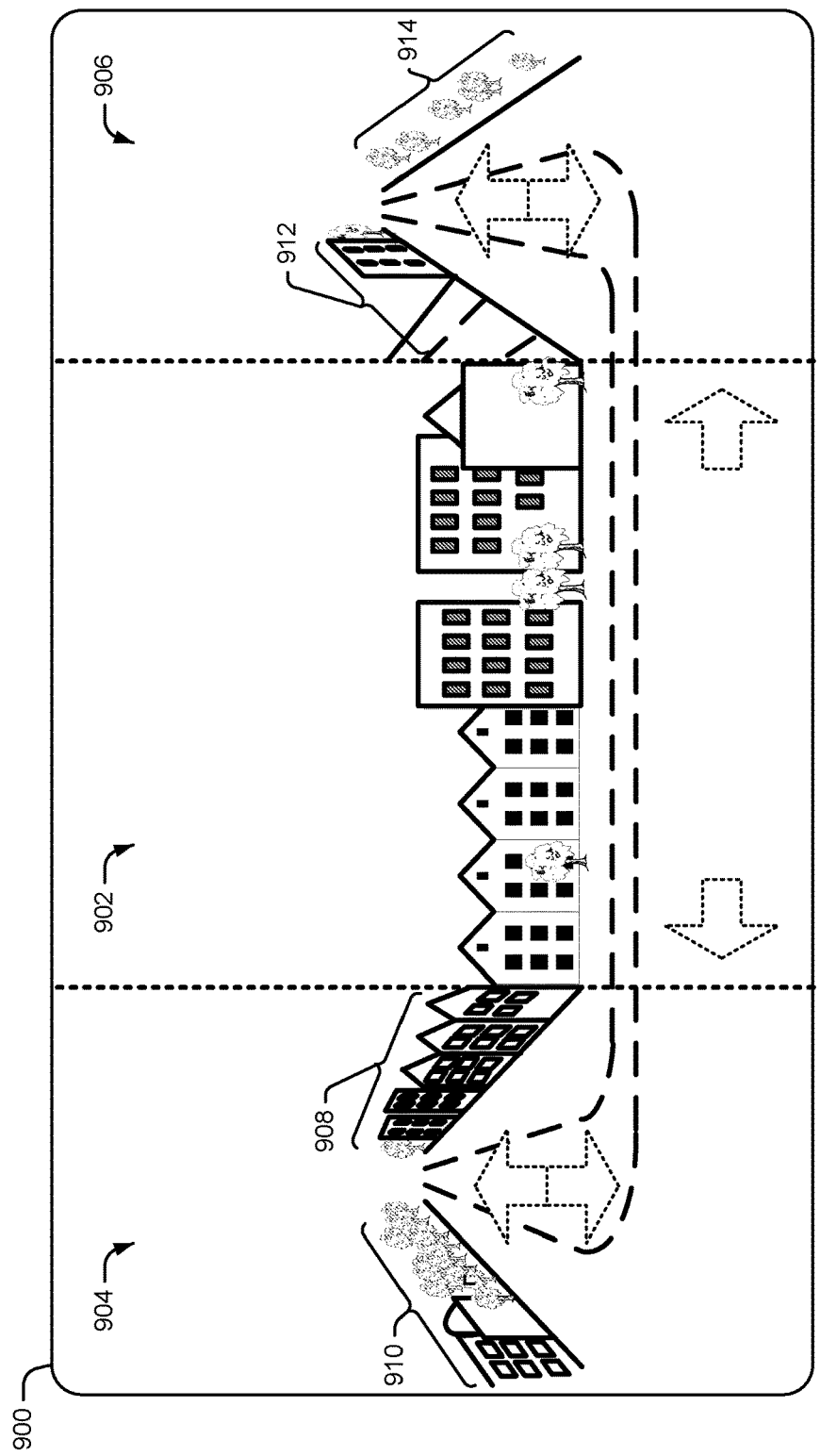
FIG. 9 illustrates an example user interface in accordance with one or more embodiments.

FIG. 9 illustrates an example user interface in accordance with one or more embodiments, generally at 900, for navigating one or more views of a geographic location and utilizing bubble views to provide navigation context. According to some embodiments, the user interface 900 can be associated with one or more applications, such as the web browser 108, and can be displayed by a computing device, such as computing device 102.

The user interface 900 includes a block view 902 with a first bubble view 904 at the left end of the block view 902 and a second bubble view 906 at the right end of the block view 902. According to one or more embodiments, the first bubble view 904 and the second bubble view 906 can be stitched to the block view 902 to provide a visual indication of one or more locations that occur along the periphery of the block view 902. For example, the first bubble view 904 can include images from both sides of a roadway that runs along the front of the block view 902 and to the left of the block view 902. Thus, according to some embodiments, a region 908 can correspond to an extension of block view 902 to the left, and a region 910 can correspond to a view to the left of the block view 902 and across the roadway from the block view 902. In some implementations, if the block view 902 is scrolled to the right (e.g., by selecting one of the selectable navigation arrows), the region 908 can populate the block view 902 and can be displayed as a block view instead of a bubble view.

Further to some embodiments, the second bubble view 906 can include images from both sides of a roadway that runs along the front of the block view 902 and to the right of the block view 902. Similar in some respects to the first bubble view 904, the second bubble view 906 includes a region 912 that can correspond to an extension of block view 902 to the right, and a region 914 that can correspond to a view to the right of the block view 902 and across the roadway from the block view 902.

As illustrated here, in some embodiments the first bubble view 904 and the second bubble view 906 include selectable arrows that can be selected (e.g., via user input) to navigate within one or more of the bubble views. Further to some embodiments, navigation within one of the views (e.g., the block view 902, the first bubble view 904, or the second bubble view 906) can cause an automatic navigation in one or more of the other views.

In some embodiments, when no navigation is occurring within the user interface 900, only the block view 902 can be displayed. When a navigation occurs (e.g., within the block view 902), one or more of the first bubble view 904 and/or the second bubble view 906 can be displayed to provide context for the navigation. For example, if the block view 902 is navigated to the left, only the first bubble view 904 can be displayed adjacent to the block view to provide context for navigation in that particular direction. Additionally and/or alternatively, if the block view 902 is navigated to the right, only the second bubble view 906 can be displayed adjacent to the block view.

The arrangements of visual elements included in the user interfaces discussed above are for purposes of example only, and it is to be appreciated that any suitable arrangements of visual elements may be utilized without departing from the spirit and scope of the claimed embodiments.

Mapping Between Views and the World

This section discusses example ways of mapping between pixels that form a view (e.g., a bubble view, a block view, and/or a map view) and coordinates that make up particular locations in the geographic world, according to some embodiments. For purposes of this discussion a block view will be considered, but the techniques can apply to any of the views discussed herein.

One example technique for mapping pixels in a block view to geographic coordinates uses position information (e.g., the position information 118) to determine coordinates for a 3-dimensional point in the world $(X_W, Y_W, Z_W)$. In some implementations, $X_W$ can be a latitude value, $Y_W$ a longitude value, and $Z_W$ a height value. The coordinates $(X_W, Y_W, Z_W)$ can be mapped to a pixel $(S^{-1} \cdot X_V, S^{-1} \cdot Y_V)$ of a block view, where $S^{-1}$ is a scale factor of the block view, $X_V$ is an X value of the pixel, and $Y_V$ is the Y value of the pixel.

According to one or more embodiments, one or more of several different techniques for storing the mappings between block view pixels and geographic coordinates can be utilized examples of which are provided just below.

(1) List Technique—For every pixel used to display a block view there are geographic coordinates that describe the location of the pixel in the geographic world. For example, every pixel can have a latitude value, a longitude value, and a height (e.g., elevation) value.

(2) Column Technique—the block view can be divided into columns and geographic coordinates can be associated with each column. For example, in one or more embodiments a block view is stitched together using a plurality of camera shots, and a camera position (e.g., in geographic coordinates) for each camera shot can be known. Thus, each camera position can be considered a column, and the known camera positions can be mapped to geographic coordinates to provide a mapping between the block view and the geographic world.

(3) Function Technique—an approximation of the mapping between block view pixels and geographic coordinates can be made by characterizing the mapping as a function, such as a polynomial.

(4) Bubble Technique—information from bubble views can be used to map geographic coordinates to pixels of a block view. For example, each of several bubble views can be associated with geographic coordinates based on a location where the images used to create each bubble view were captured. The block view can be mapped to each of the bubble views, and the geographic coordinates from each of the bubble views can be mapped to a particular location within the block view.

Example Methods

Figure 10:
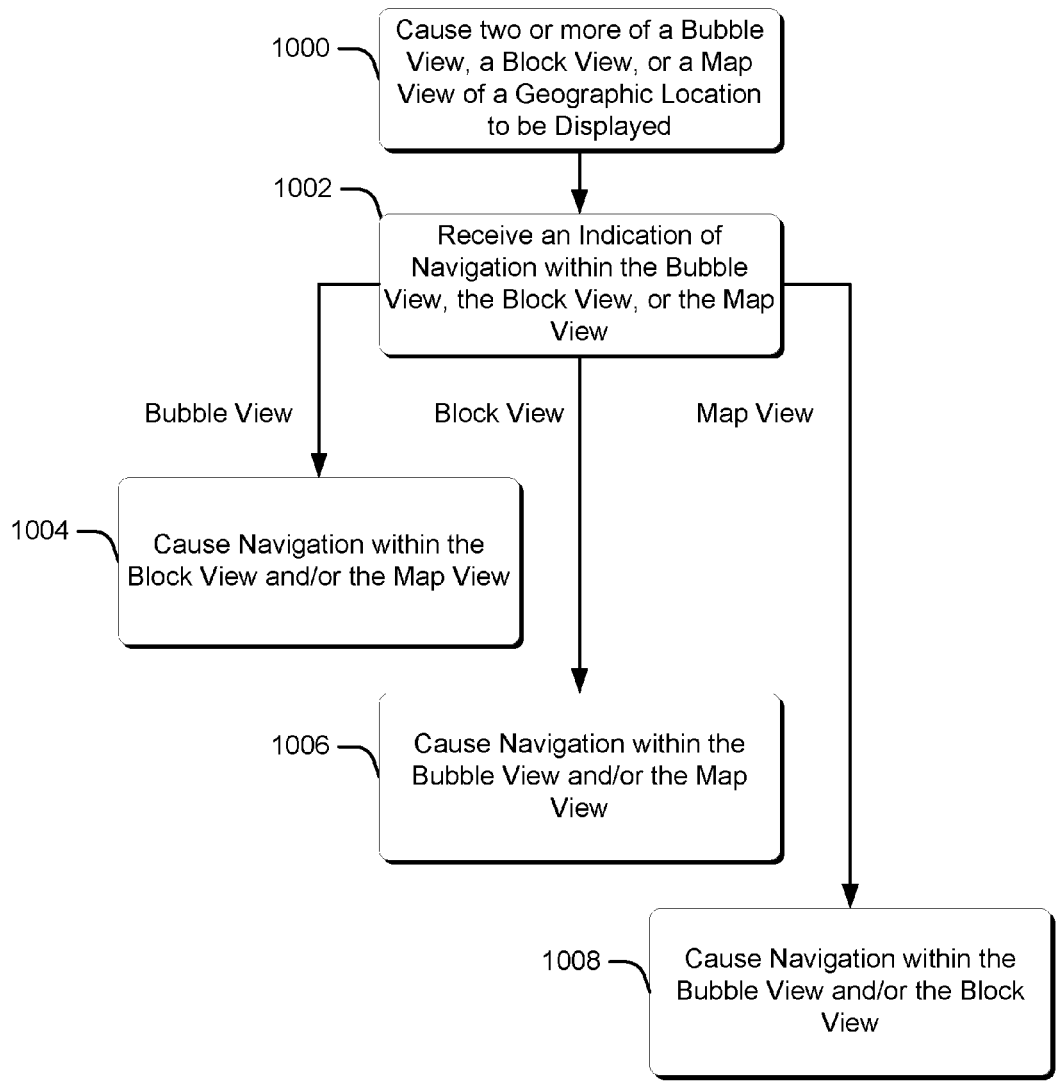
FIG. 10 is a flow diagram that describes steps in a method in accordance with one or more embodiments.

FIG. 10 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content.

Step 1000 causes two or more of a bubble view, a block view, or a map view of a geographic location to be displayed. According to some embodiments, the bubble view, block view, and/or the map view can be displayed as part of a user interface, e.g., in response to a search for a particular geographic location. Step 1002 receives an indication of navigation within the bubble view, the block view, or the map view, e.g., in response to user input to one or the views. Example ways of navigating within the bubble view, block view, and/or the map view are discussed above. If the navigation is within the bubble view ("Bubble View"), step 1004 causes navigation within the block view and/or the map view. According to one or more embodiments, the navigation within the block view and/or the map view can occur automatically and responsive to the navigation within the bubble view.

Alternatively, if the navigation is within the block view ("Block View"), step 1006 causes navigation within the bubble view and/or the map view. According to one or more embodiments, the navigation within the bubble view and/or the map view can occur automatically and responsive to the navigation within the block view. In some example implementations, navigation to a different block view can occur responsive to navigation with a current block view. For example, if a user navigates to an intersection within a block view, the block view can change to a different street and/or a different side of a street. Thus, one or more different block views can be displayed responsive to navigation within a particular block view.

As another alternative, if the navigation is within the map view ("Map View"), step 1008 causes navigation within the bubble view and/or the block view. According to one or more embodiments, the navigation within the bubble view and/or the block view can occur automatically and responsive to the navigation within the map view.

Figure 11:
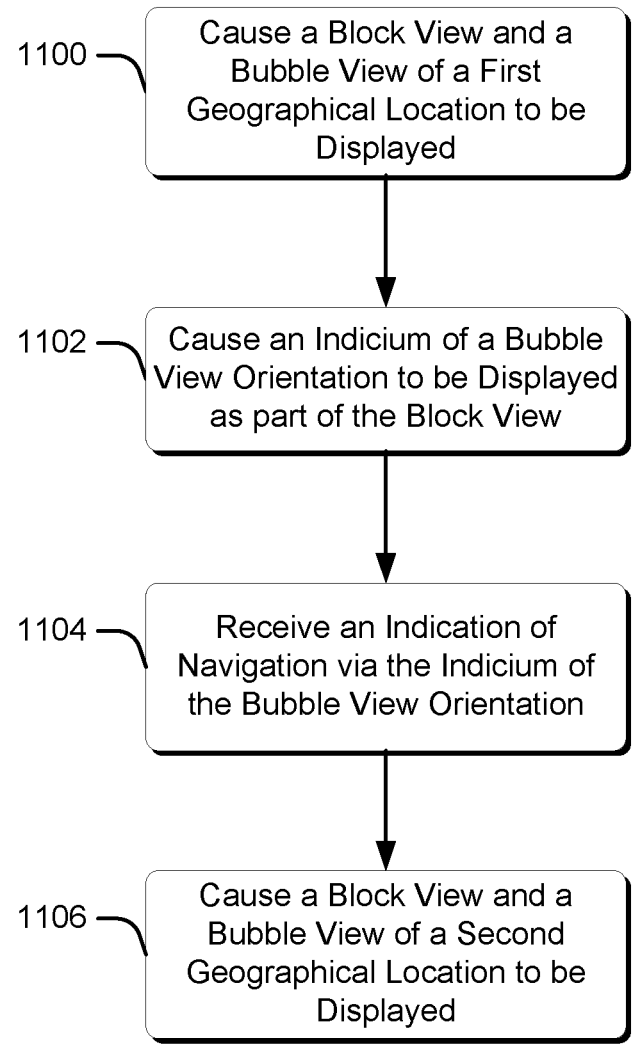
FIG. 11 is a flow diagram that describes steps in a method in accordance with one or more embodiments.

FIG. 11 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content.

Step 1100 causes a block view and a bubble view of a first geographic location to be displayed. According to some embodiments, the block view and the bubble view can be displayed in a user interface, such as one or more of the user interfaces discussed above. Step 1102 causes an indicium of a bubble view orientation to be displayed as part of the block view. One example of such an indicium is the block icon 208 illustrated in FIG. 2.

Step 1104 receives an indication of navigation via the indicium of the bubble view orientation. For example, and as discussed above with respect to FIG. 2, a user can manipulate the block icon 208 to navigate within the block view and/or the bubble view. Step 1106 causes a block view and a bubble view of a second geographic location to be displayed. In some embodiments, step 1106 can occur responsive to receiving the indication of navigation via the indicium of the bubble view orientation.

Figure 12:
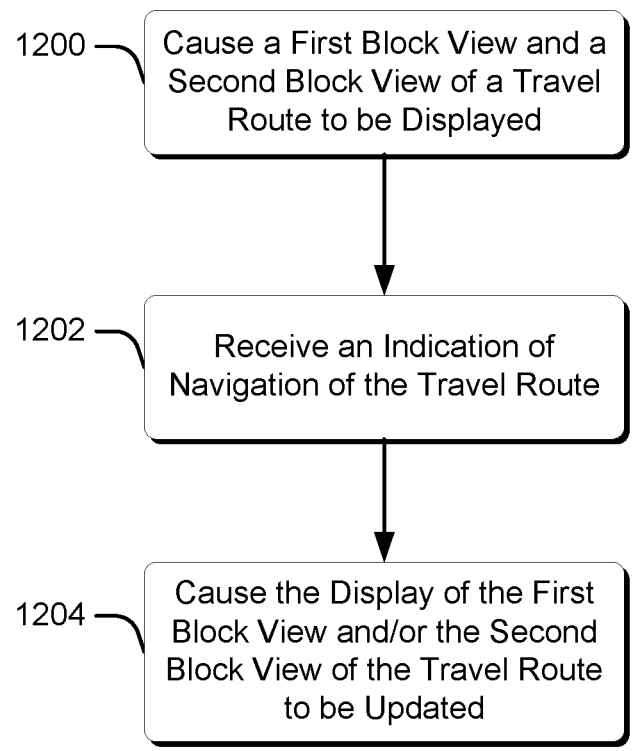
FIG. 12 is a flow diagram that describes steps in a method in accordance with one or more embodiments.

FIG. 12 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content.

Step 1200 causes a first block view and a second block view of a travel route to be displayed. According to one or more embodiments, the first block view and the second block view of the travel route can be displayed in a user interface, such as the user interface 600 illustrated in FIG. 6. Step 1202 receives an indication of navigation of the travel route. In some embodiments, navigation of the travel route can occur via the first block view, the second block view, or any other appropriate view (e.g., a bubble view and/or a map view). Step 1204 causes the display of the first block view and/or the second block view of the travel route to be updated. As referenced above in the discussion of FIG. 8, in some implementations a travel route can have varying landscapes, and thus block views that are displayed during a navigation of the travel route can be dynamically updated as the travel route is navigated. For example, where bubble views along a travel route are considered as individual capture events, one or more block views can be updated for each navigation to a subsequent capture event (e.g., bubble view).

As also referenced above in the discussion of FIG. 8, in some implementations a travel route can include one or more homogenous or repetitive landscapes. Thus, in navigating such a travel route, one or more static images can be displayed in a block view to represent a relatively homogenous or repetitive landscape. See, for example, the second block view 806 illustrated in FIG. 8. According to one or more embodiments, when navigation occurs from one capture event to another along the travel route, the image displayed in a particular block view can remain unchanged until a landscape with more visual variation is encountered.

Figure 13:
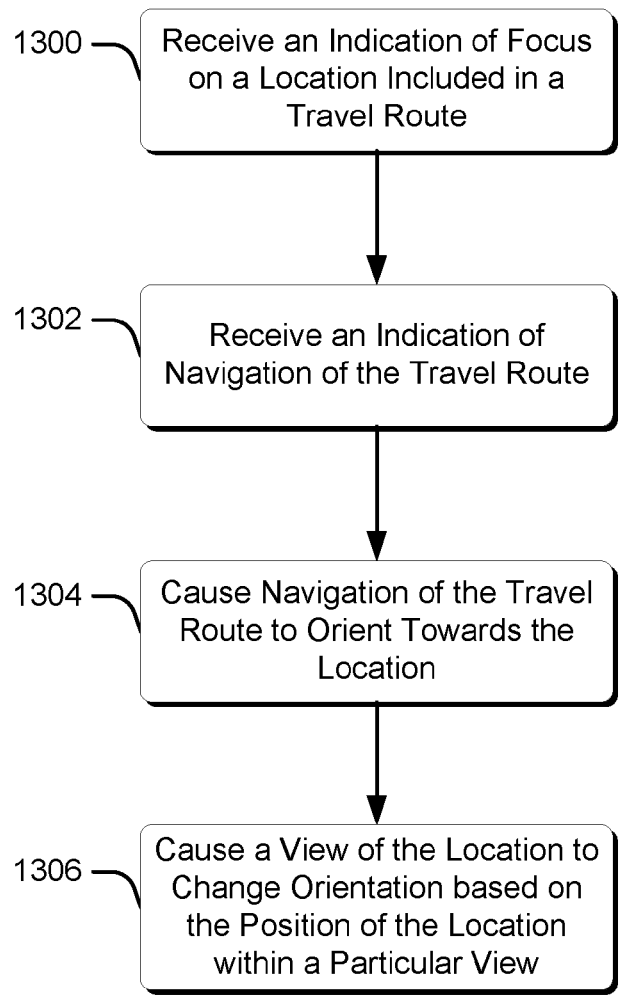
FIG. 13 is a flow diagram that describes steps in a method in accordance with one or more embodiments.

FIG. 13 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content. In one or more embodiments, the user interface 702 illustrated in FIG. 7 can be utilized in implementing the method.

Step 1300 receives an indication of a focus on a location included in a travel route. For example, a cursor can be hovered over the location that is displayed as part of a display of the travel route. Further to some embodiments, a travel route can include a roadway or other navigable route. Step 1302 receives an indication of navigation of the travel route. For example, and according to some embodiments, a zoom function (e.g., in a bubble view) can be activated to cause navigation of the travel route, an icon can be dragged along the travel route, and so on. Step 1304 causes navigation of the travel route to orient towards the location. In some example embodiments, placing focus on a location can cause a display of the travel route to center on the location.

Step 1306 causes a view of the location to change orientation based on the position of the location within a particular view. For example, when the location appears further away along the travel route, the view of the location can be from the perspective of someone travelling along the travel route and viewing the location as it approaches along the travel route. See, for example, the user interface 702 illustrated at 700 of FIG. 7. As a further example, when the navigation proceeds and the location appears to come closer in perspective, the view can re-center on the location. According to some embodiments, when the location reaches a certain apparent proximity in the navigation of the travel route, the view perspective can change from someone traveling along the travel route to the perspective of someone facing the location.

Figure 14:
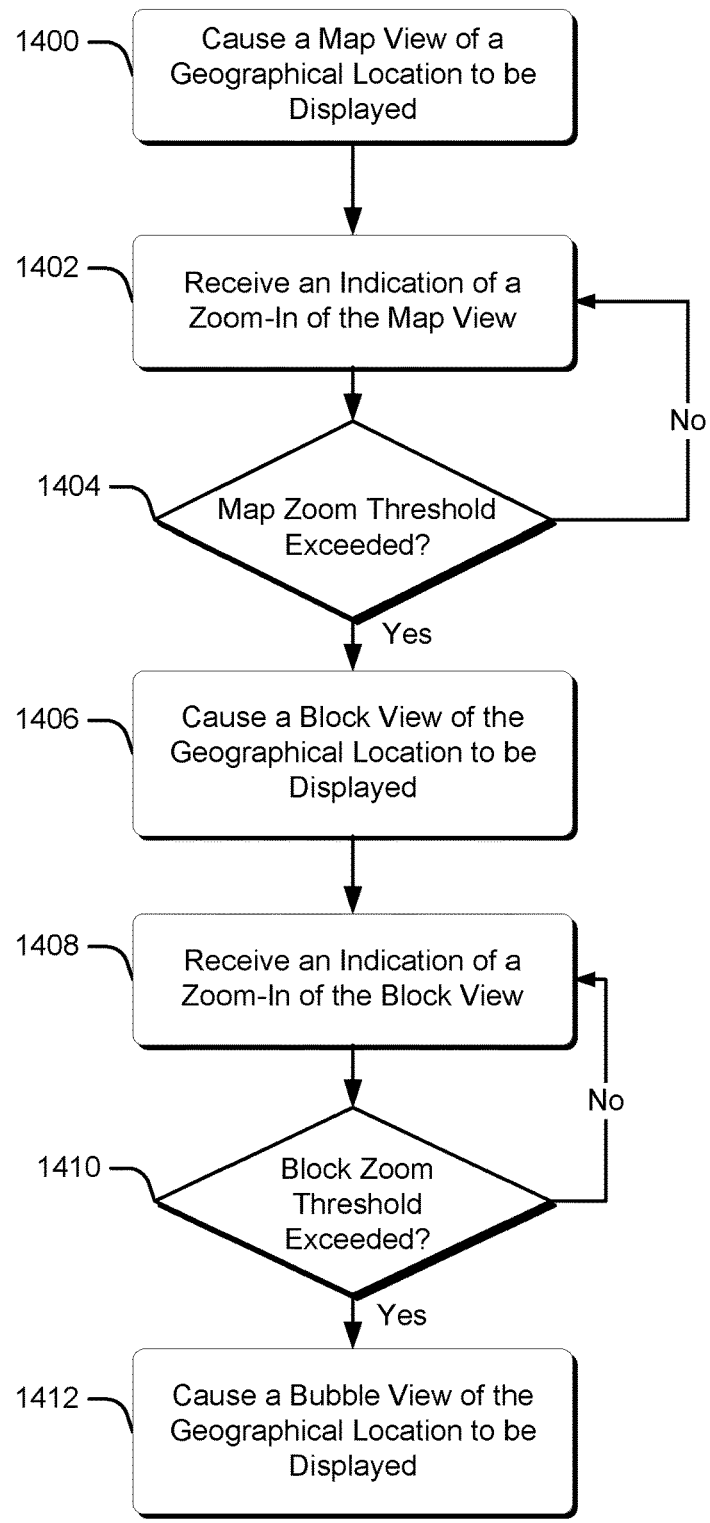
FIG. 14 is a flow diagram that describes steps in a method in accordance with one or more embodiments.

FIG. 14 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content.

Step 1400 causes a map view of a geographic location to be displayed. Step 1402 receives an indication of a zoom-in of the map view. Example ways of zooming are discussed above. Step 1404 determines if a map zoom threshold has been exceeded. In some embodiments, a particular threshold zoom level can be specified for a map view. If the map zoom threshold has not been exceeded, the method returns to step 1402. On the other hand, if the map zoom threshold has been exceed, step 1406 causes a block view of the geographic location to be displayed. In some embodiments, the block view can replace the map view in a particular user interface. Alternatively, the block view can populate a window that is displayed adjacent to the map view.

Step 1408 receives an indication of a zoom-in of the block view. Step 1410 determines if a block zoom threshold has been exceeded. In some embodiments, a particular threshold zoom level can be specified for a block view. If the block zoom threshold has not been exceeded, the method returns to step 1408. On the other hand, if the block zoom threshold has been exceeded, step 1412 causes a bubble view of the geographic location to be displayed. In some embodiments, the bubble view can replace the block view in a particular user interface. Alternatively, the bubble view can populate a window that is displayed adjacent to the block view and/or the map view.

While the method is discussed from the perspective of zooming-in from a map view to a block view and/or from a block view to a bubble view, in some embodiments the method can enable views to be zoomed-out from a bubble view to a block view and/or from a block view to a map view. Further to such embodiments, the zoom threshold can include a "zoom-out" threshold such that when a particular view is zoomed-out past the threshold, another view can be displayed. Thus, in one or more embodiments, the method enables transitions between views by zooming-in and/or out from a particular view.

Figure 15:
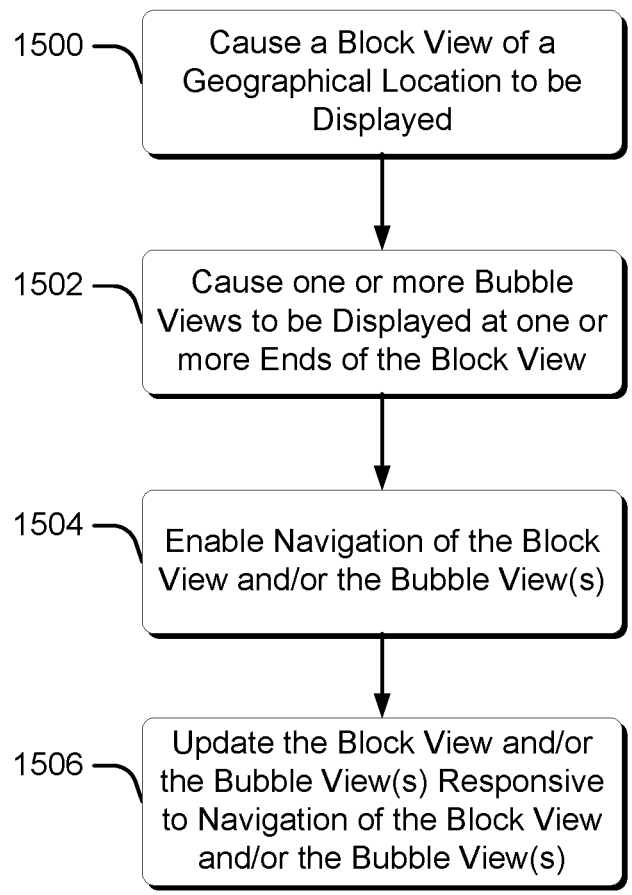
FIG. 15 is a flow diagram that describes steps in a method in accordance with one or more embodiments.

FIG. 15 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 and/or the map service 112) to enable navigation of geographic content.

Step 1500 causes a block view of a geographic location to be displayed. Step 1502 causes one or more bubble views to be displayed at one or more ends of the block view. For an example of displaying bubble views at the ends of a block view, see user interface 900 illustrated in FIG. 9. Step 1504 enables navigation of the block view and/or the one or more bubble views. Step 1506 updates the block view and/or the one or more bubble views responsive to the navigation of the block view and/or the one or more bubble views.

Having discussed example methods according to one or more embodiments, consider now a discussion of an example system that can be utilized to implement the above-described embodiments.

Example System

FIG. 16 illustrates an example computing device 1600 that can implement the various embodiments described above. Computing device 1600 can be, for example, computing device 102 of FIG. 1 or any other suitable computing device.

Computing device 1600 includes one or more processors or processing units 1602, one or more memory and/or storage components 1604, one or more input/output (I/O) devices 1606, and a bus 1608 that allows the various components and devices to communicate with one another. Bus 1608 represents one or more of any of several types of bus structures, including a memory bus or memory controller, a peripheral bus, an accelerated graphics port, and a processor or local bus using any of a variety of bus architectures. Bus 1608 can include wired and/or wireless buses.

Memory/storage component 1604 represents one or more computer storage media. Component 1604 can include volatile media (such as random access memory (RAM)) and/or nonvolatile media (such as read only memory (ROM), Flash memory, optical disks, magnetic disks, and so forth). Component 1604 can include fixed media (e.g., RAM, ROM, a fixed hard drive, etc.) as well as removable media (e.g., a Flash memory drive, a removable hard drive, an optical disk, and so forth).

One or more input/output devices 1606 allow a user to enter commands and information to computing device 1600, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide techniques for geographic navigation via one or more block views. According to some embodiments, a block view can include a visual image of a geographic location that is visually similar to a panoramic image. In some example implementations, a block view can be scrolled to navigate images of a geographic location. In one or more embodiments, a bubble view can be displayed of one or more locations within the block view. The bubble view can include a zoomed image of one or more aspects of a block view. Further to some embodiments, a map view can be utilized along with the block view and/or the bubble view. The map view can include a two-dimensional representation of the geographic location from an aerial perspective, and can include a more general level of detail concerning the geographic location, such as streets, cities, states, bodies of water, and so on.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computerized system for navigation within a user interface, wherein the system comprises:
   a processor; and
   memory storing computerized instructions that when executed by the processor cause the processor to:
      receive an indication of a zoom-in on a map view of a geographic location displayed within the user interface;
      determine that the zoom-in on the map view has reached a map zoom threshold;
      in response to determining that the zoom-in has reached the map zoom threshold, display a block view of the geographic location;
      receive an indication of a zoom-in on the block view of the geographic location, wherein the block view displays a side of a travel route through the geographic location;
      determine that the zoom-in on the block view has reached a block zoom threshold; and
      in response to determining that the zoom-in has reached the block zoom threshold, display a bubble view of the geographic location.

2. The computerized system for navigation of claim 1, wherein the memory further comprises computerized instructions that when executed by the processor cause the processor to:
   receive an indication of a zoom-out of the bubble view of the geographic location;
   display the block view of the geographic location;
   receive an indication of a zoom-out of the block view of the geographic location; and
   display a map view of the geographic location.

3. The computerized system for navigation of claim 1, wherein the map view comprises a two-dimensional representation of a geographic location from an aerial perspective.

4. The computerized system for navigation of claim 1, wherein the bubble view comprises zoomed image of one or more aspects of the block view.

5. The computerized system for navigation of claim 1, wherein the bubble view comprises an actual image of one or more aspects of the block view.

6. The computerized system for navigation of claim 1, wherein the memory further comprises computerized instructions that when executed by the processor cause the processor to:
   present the bubble view with a bubble icon that points along the travel route through the geographic location;
   receive a selection of the bubble icon; and
   navigate the bubble view along the travel route.

7. The computerized system for navigation of claim 1, wherein the memory further comprises computerized instructions that when executed by the processor cause the processor to:
   receive a selection of an object that is displayed in the bubble view;
   place focus on the object;
   navigate toward the object in the bubble view.

8. The computerized system for navigation of claim 7, wherein the memory further comprises computerized instructions that when executed by the processor cause the processor to:
   rotate the bubble view towards the object as the navigation approaches the object.

9. The computerized system for navigation of claim 8, wherein the memory further comprises computerized instructions that when executed by the processor cause the processor to:
   reach a location of the object in focus in the bubble view;
   receive an indication of zoom-in on the object in focus; and
   zoom into a front surface of the object.

10. The computerized system for navigation of claim 9, wherein the indication of zoom-in on the object in focus comprises a second selection of the bubble icon.

11. The computerized system for navigation of claim 9, wherein the abstraction of the geographic location comprises an approximated outline drawing of the geographic location.

12. The computerized system for navigation of claim 1, wherein the block view comprises an abstraction of the geographic location.

13. The computerized system for navigation of claim 1, wherein the block view comprises a linear view of two or more elevation images stitched together.

14. A computerized method for navigation within a user interface, the method comprising:
   displaying a map view of a geographic location within the user interface;
   in response to receiving a zoom-in selection from the map view, zooming into the map view;
   in response to determining that map the view has reached the map zoom threshold, displaying a block view of the geographic location, wherein the block view comprises a side of a travel route through the geographic location;
   in response to receiving a zoom-in selection from the block view, zooming into the block view; and
   in response to determining that a block zoom threshold has been reached, displaying a bubble view of the geographic location.

15. The computerized method for navigation of claim 14 further comprising:
   receiving a zoom-in selection from the bubble view; and
   determining an effect of the zoom-in selection based on a location of a particular object that is in focus in the bubble view.

16. The computerized method for navigation of claim 14 further comprising:
   in response to receiving a selection of an object displayed in the bubble view, placing focus on that object;
   orienting the bubble view toward the object; and
   navigating toward the object in the bubble view.

17. The computerized method for navigation of claim 14 further comprising:
   displaying a bubble icon in the bubble view that points along a travel route through the geographic location; and
   in response to receiving a selection of the bubble icon, navigating the bubble view along the travel route.

18. The computerized method for navigation of claim 17 further comprising:
   receiving a selection to change an orientation of the bubble icon to point along a different direction of the travel route;
   navigating the bubble view along the different direction of the travel route.

19. The computerized method for navigation of claim 17 further comprising:
   in response to receiving a selection of one of the plurality of objects, focusing the bubble view on the selected one of the plurality of objects;
   receiving a second selection of the bubble icon; and zooming into a surface of the selected one of the plurality of objects.

20. The computerized method for navigation of claim 14, wherein the block view comprises a linear view of two or more elevation images stitched together.

* * * * *